(12) United States Patent
Johannsen

(10) Patent No.: US 8,371,430 B2
(45) Date of Patent: Feb. 12, 2013

(54) LOW PROFILE TELESCOPIC CONVEYOR ASSEMBLY

(75) Inventor: Thorkil J Johannsen, Norval (CA)

(73) Assignee: Thor Global Enterprises Ltd., Ontario (CA)

( * ) Notice: Subject to any disclaimer, the term of this patent is extended or adjusted under 35 U.S.C. 154(b) by 169 days.

(21) Appl. No.: 12/941,651

(22) Filed: Nov. 8, 2010

(65) Prior Publication Data

US 2011/0226583 A1 Sep. 22, 2011

(30) Foreign Application Priority Data

Mar. 19, 2010 (CA) .................................... 2697319

(51) Int. Cl.
*B65G 15/26* (2006.01)
(52) U.S. Cl. ...................... 198/313; 198/318; 198/861.5
(58) Field of Classification Search .................. 198/312, 198/313, 318, 861.5
See application file for complete search history.

(56) References Cited

U.S. PATENT DOCUMENTS

| 4,821,870 A * | 4/1989 | Simelunas et al. ......... 198/861.5 |
| 4,946,027 A * | 8/1990 | Jenkins ...................... 198/861.5 |
| 5,498,027 A * | 3/1996 | Kelley et al. ............... 280/728.3 |
| 6,283,269 B1 * | 9/2001 | Mayer ........................... 198/313 |
| 6,422,785 B1 * | 7/2002 | Ruggles et al. ............... 198/318 |

* cited by examiner

*Primary Examiner* — James R Bidwell
(74) *Attorney, Agent, or Firm* — The Farrell Law Firm, P.C.

(57) ABSTRACT

A telescopic or non-telescopic conveyor system having a feed section operatively associated with the conveyor system for feeding materials to one end of the conveyor system is provided. The conveyor system is pivotably mounted to the feed section to pivot the telescopic conveyor system to pivotably rotate relative to the feed section. In another embodiment, the feed section of the conveyor includes a frame to which is attached one or more movable baffles for moving material which has been collected at the sides of the feed section to permit displacement of the same upon lateral movement of the feed section.

16 Claims, 8 Drawing Sheets

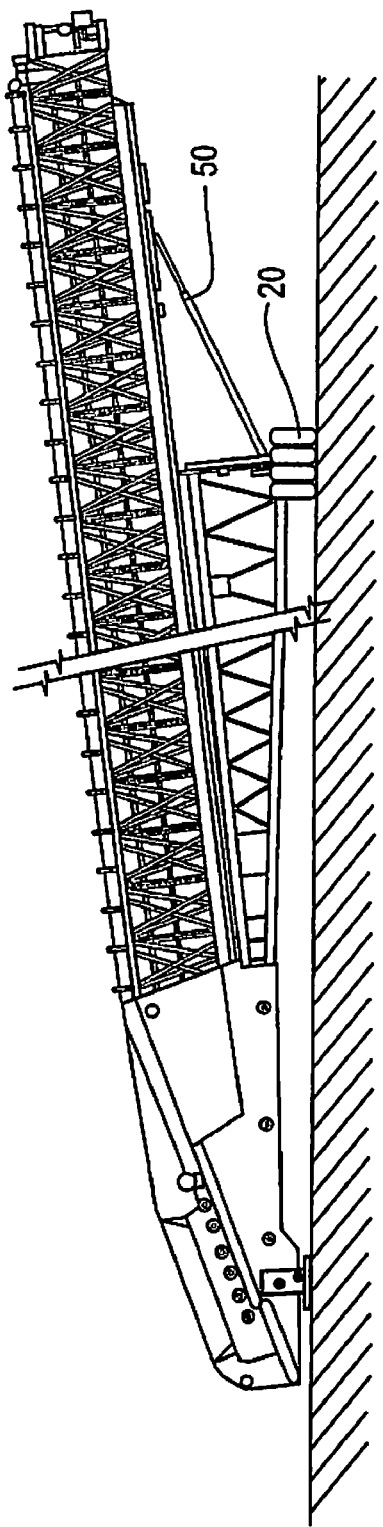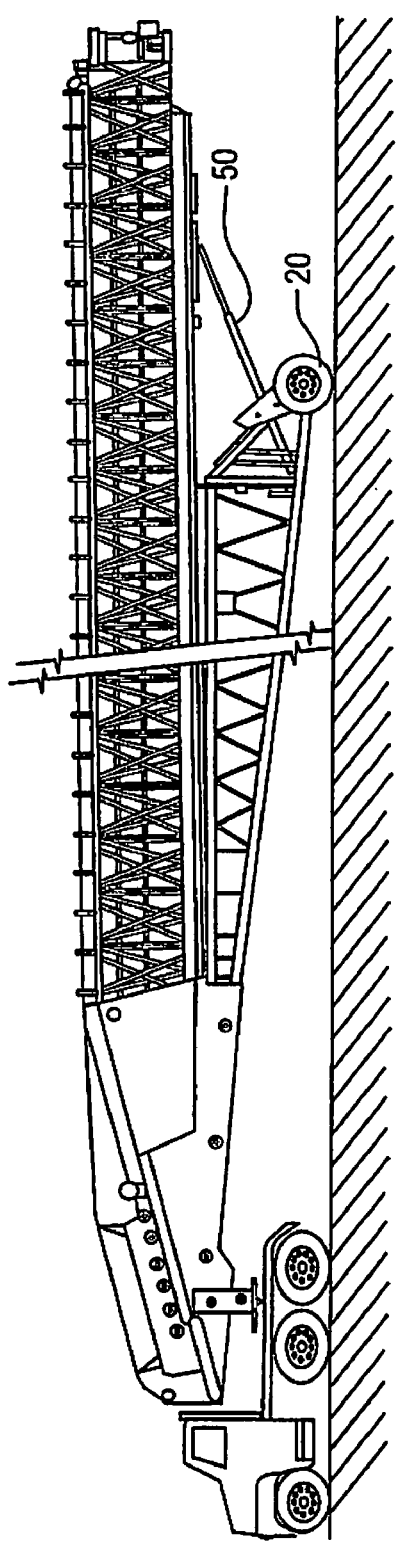

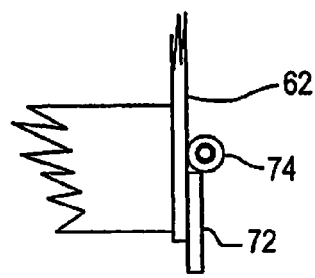
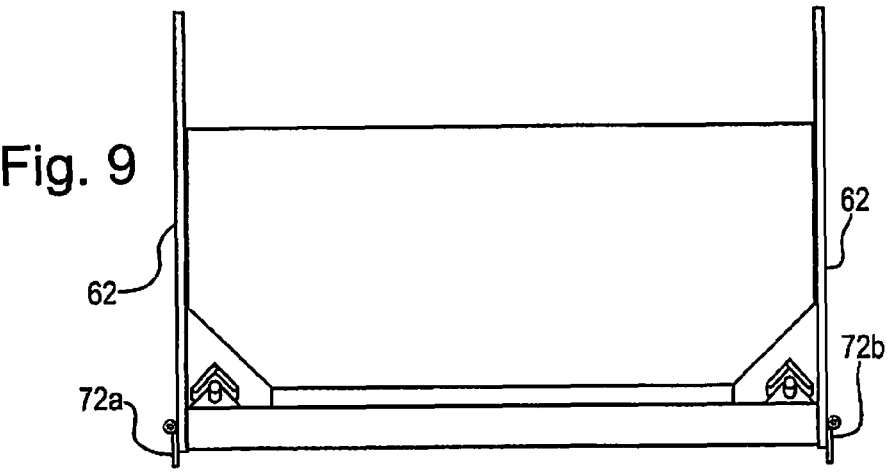
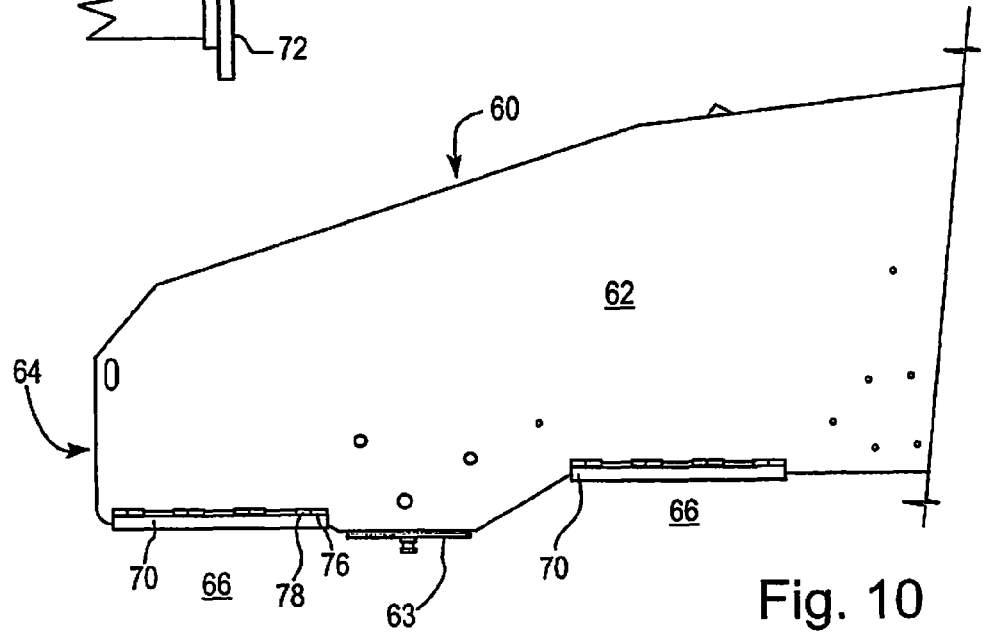

LOW PROFILE TELESCOPIC CONVEYOR ASSEMBLY

PRIORITY

This application claims priority under 35 U.S.C. §119 to an application filed in the Canadian Intellectual Property Office on Mar. 19, 2010, assigned Patent Application No. 2,697,319, the contents of which is incorporated herein by reference.

BACKGROUND OF THE INVENTION

This invention relates to transportable conveyor systems and particularly to telescopic or non-telescopic transportable conveyor systems.

Today, conveyor systems are of two main types, those which are telescopic or non-telescopic conveyor systems which are commonly used to transport materials from one location to another. The basic difference between telescopic and non-telescopic conveyor systems relates to the function of the conveyor system to transport aggregates over different distances—telescopic conveyor systems are frequently capable of transporting material two or three times the more limited fixed or non-telescopic conveyor systems. There are several known examples of conveyor systems, particularly extendable or telescopic systems, as disclosed, for example, in Canadian patent 2,223,202, Thor Global Enterprises Ltd., issued Jun. 22, 2004, as well as e.g. U.S. Pat. No. 3,378,125 issued Apr. 16, 1968 to Fogg, U.S. Pat. No. 3,825,107 issued Jul. 23, 1974 to Cary et al., and U.S. Pat. No. 5,351,809 issued Oct. 4, 1994 to Gilmore et al.

Both telescopic and non-telescopic conveyor systems find application in different industries such as the aggregate industry where mobile conveyors are used to form stockpiles of aggregate materials. Depending on the type of industry, the telescopic conveyors will vary in size—for example, those used in the aggregate industry have generally large belts to permit movement of large volumes of aggregates.

Today, the length of the conveyor system is such that they can range from e.g. 40 feet to 80 feet or more for a single non-telescopic conveyor system; for telescopic versions, such conveyor systems are manufactured to have an extended length of e.g. 100 feet to 150 feet or more.

As disclosed in Canadian '202, telescopic conveyor systems utilize technology where one length of the conveyor system is positioned within a second length for transport purposes; when a first length is extended from the second length of conveyor system, the whole system is braced by suitable braces connected to a transport frame. For transport, conveyor systems are generally provided with transport wheels and towed or pulled by a truck or similar vehicle from e.g. a site of manufacture to an area of usage.

Both non-telescopic and telescopic conveyor systems conventionally include a feed section operatively associated with the conveyor in order to provide feed material to be placed on the conveyor and permit its transportation to a different point using the conveyor system. Conventional technology for feed systems utilize a system fixedly secured to the telescopic conveyor system; typically this is by mounting or attaching the frame of the feed system to the lower end of the outer telescopic conveyor component. Mounting of the feed unit would be by welding, bolting or other suitable conventional means.

When the frame of the feed system is fixedly secured to the lower end of the conveyor system, obviously the feed system will move in unison with the movement of the conveyor system. This results in different loading positions for feeding the feed system; typically, this can vary from several inches to several feet or more depending on the mounting of the conveyor system to the feed system.

It would be desirable to provide a fixed constant reference point for location of the feed system relative to the telescopic conveyor system since otherwise, adjustments have to be made to accommodate different sources of feed to the feed system. Cessation of the operation of the complete unit to effect adjustments to the height of the feed unit is time consuming and results in lower production capacity for the conveyor system.

In another embodiment of the present invention and with respect to the known prior art, the conveyor system, whether it be telescopic or non-telescopic, is adapted to distribute (as an example) aggregate material to form stock piles, by virtue of the conveyor system moving back and forth laterally so that the aggregate is discharged in semi-circular piles of the aggregate. When aggregate piles have reached a sufficient height, the conveyor system, which is mounted on wheels, is moved from one site to another or displaced from its original position and moved either sideways or backwards to permit new aggregate piles to be formed. One of the problems that both the telescopic and non-telescopic conveyor systems run into is that the feed end of the conveyor system, when e.g. aggregate is loaded to feed the conveyor, aggregate will sometimes spill over the sides of the feed section onto the ground or substrate where the conveyor system is working. Upon lateral movement of the conveyor and the feed section for distribution of the aggregate to form piles, the excess aggregate which has fallen over the feed section on one or both sides of the feed section, can slow down or block the lateral or swinging movement of the conveyor system until it is cleared away, either manually or by some suitable equipment.

It would be desirable to provide the feed section of a conveyor system with a structure whereby the loose aggregate at the sides of the conveyor system could be displaced from the path of travel of the feed section in a manner such that downtime for the equipment is not encountered or where additional equipment has to be brought in to clean up the site prior to continued usage of the conveyor system.

BRIEF SUMMARY OF THE INVENTION

In one aspect of the present invention, there is provided a conveyor system for transporting material, which is either telescopic or non-telescopic, and in which the system has a feed section operatively associated with the conveyor system for feeding materials to one end of the conveyor system. The improvement comprises the conveyor system being pivotably mounted to the feed section to pivot the conveyor system to pivotably rotate relative to the feed section.

In another aspect of the invention, the conveyor system includes a lower section pivotably associated with an end section of the feed section.

In yet a further aspect of the invention, the conveyor system includes a rectangular frame having pairs of spaced apart frame members; the feed section of the conveyor system has a terminal end operatively connected to the conveyor system for feeding materials from the feed section to the conveyor system; the feed section is pivotably connected to the conveyor system by means of a pivot, directly or indirectly connected to one pair of the outer frame members.

In another preferred aspect of the invention, the feed section of the conveyor system comprises a non-movable feed section adapted to retain the same position of relationship with the conveyor system for feeding the conveyor system and for transporting of the conveyor system.

In another preferred aspect of the invention, the pivot point of the conveyor system relative to the feed section is spaced from a lower side of the feed section.

In another preferred aspect of the invention, the conveyor system is a telescopic conveyor system having at least one inner conveyor system extendible and retractable within an outer conveyor system.

In another preferred aspect of the invention, the conveyor system further includes a movable feed section operatively associated with the conveyor system for feeding materials to a feed end of the conveyor system, the feed section having opposed side frame members at the feed end thereof, with a conveyor feed between the opposed side frame members; and the opposed frame members of the feed section each having associated therewith baffle means, each of said baffle means being adapted to move between first and second positions upon lateral movement of the feed section; and means for mounting each of said baffle means to a respective one of said side frames to permit one of said baffle means to be placed in a first non-movable position when said feed section laterally moves in a first direction with the other of said baffle means being movable when said feed section moves in said first direction; and also wherein said feed section laterally moves in an opposite second direction, said first baffle means which is non-movable in said first position is movable when said feed section laterally moves in said second opposite direction, said other of said baffle means being non-movable when said feed section moves in said second opposite direction.

In yet another preferred aspect of the invention, each baffle means is pivotally mounted to a respective side frame member and is movable between the first and second positions, with the baffle means being mounted in opposed relationship on the side frame members. In a preferred aspect, the baffle means are baffle plates hingedly connected to a respective side frame member. Preferably the baffle means are mounted to a respective side frame member at a lower edge of the side frame members and the baffle means include at least two spaced-apart baffle plates on the side frame member.

In another aspect of the invention there is provided a conveyor system for transporting material, which is either telescopic or non-telescopic, the system having: a movable feed section operatively associated with the conveyor system for feeding materials to a feed end of the conveyor system, the feed section having opposed side frame members at the feed end thereof, with a conveyor feed between the opposed side frame members. The feed section has opposed frame members each having associated therewith baffle means, each of the baffle means are adapted to move between first and second positions upon lateral movement of the feed section. Further, there are included means for mounting each of the baffle means to a respective one of the side frames to permit one of the baffle means to be placed in a first non-movable position when the feed section laterally moves in a first direction with the other of the baffle means being movable when the feed section moves in the first direction. In the preferred aspect, the feed section laterally moves in an opposite second direction, the first baffle means which is non-movable in the first position is movable when the feed section laterally moves in the second opposite direction, the other of the baffle means being non-movable when the feed section moves in the second opposite direction.

In yet another preferred aspect, each baffle means is pivotally mounted to a respective side frame member and is movable between the first and second positions, with the baffle means being mounted in opposed relationship on the side frame members. In a preferred aspect of the invention, the baffle means are baffle plates hingedly connected to a respective side frame member. In this preferred aspect of the invention, the baffle means are mounted to a respective side frame member in a position at a lower edge of the frame members, and the baffle means includes at least two space-apart baffle plates on each of the side frame members.

In yet another preferred aspect, the conveyor system is a telescopic conveyor system having at least one inner conveyor system extendible and retractable within an outer conveyor system.

DESCRIPTION OF THE DRAWINGS

It is to be noted that the drawings presented herein are used for illustration purposes only and in the embodiments shown, a telescopic conveyor system has been illustrated; it will be understood by those skilled in the art that the inventive features of the embodiments described are applicable to both telescopic and non-telescopic conveyor systems.

FIG. 4 is a side elevational view showing an outline of the system of the present invention where the inner conveyor system is shown in a retracted lower position and with the feed section being mounted at a very low position relative to the ground and to the telescopic conveyor system;

FIG. 5 is a side elevational view showing an outline of the system of the present invention where the telescopic conveyor system is in a transport mode;

FIG. 9 is a side view of a portion of the feed section of a conveyor system according to another embodiment of the present invention, which includes baffle plates;

FIG. 10 is a partial end view taken along the lines A-A of FIG. 9 schematically showing the end of the feed section; and FIG. 11 is an enlarged end view of the baffle plate on one side of the feed section, in the area indicated by the circled B in FIG. 10.

Figure 1:
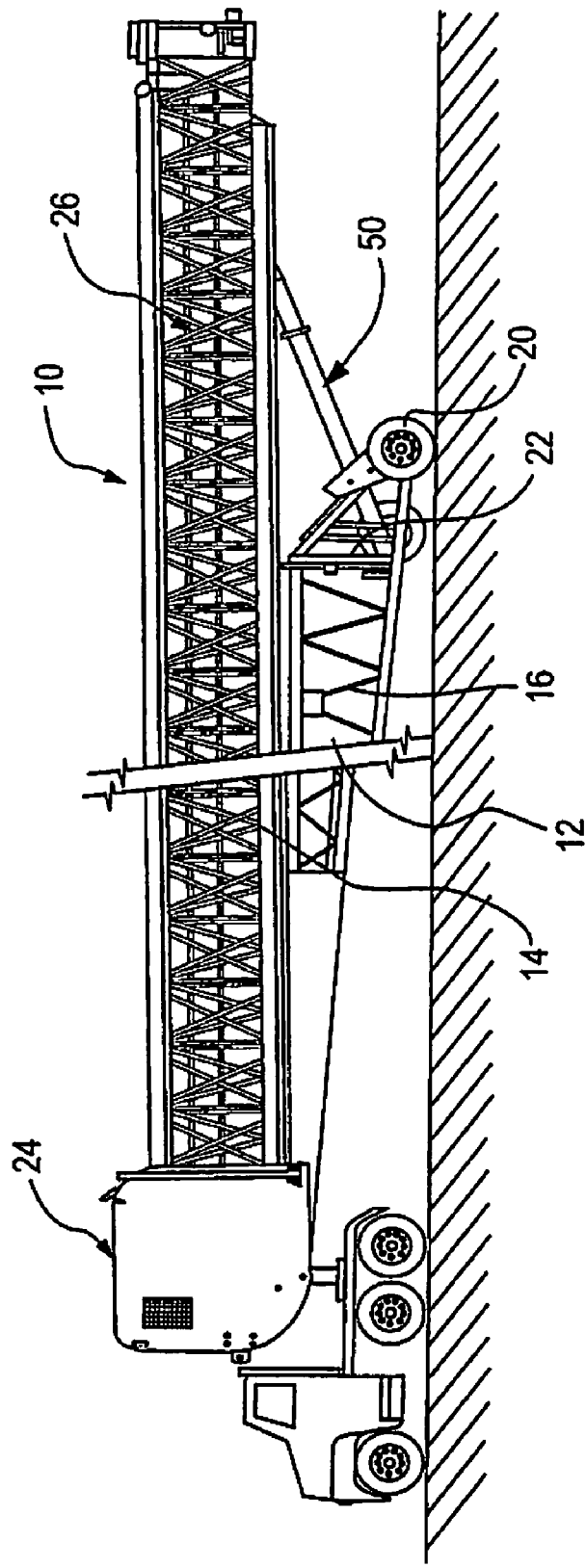
FIG. 1 is a side elevational view of a typical prior art telescopic conveyor system having a feed section and shown with one portion of the telescopic unit within the outer frame of the conveyor system.
Figure 2:
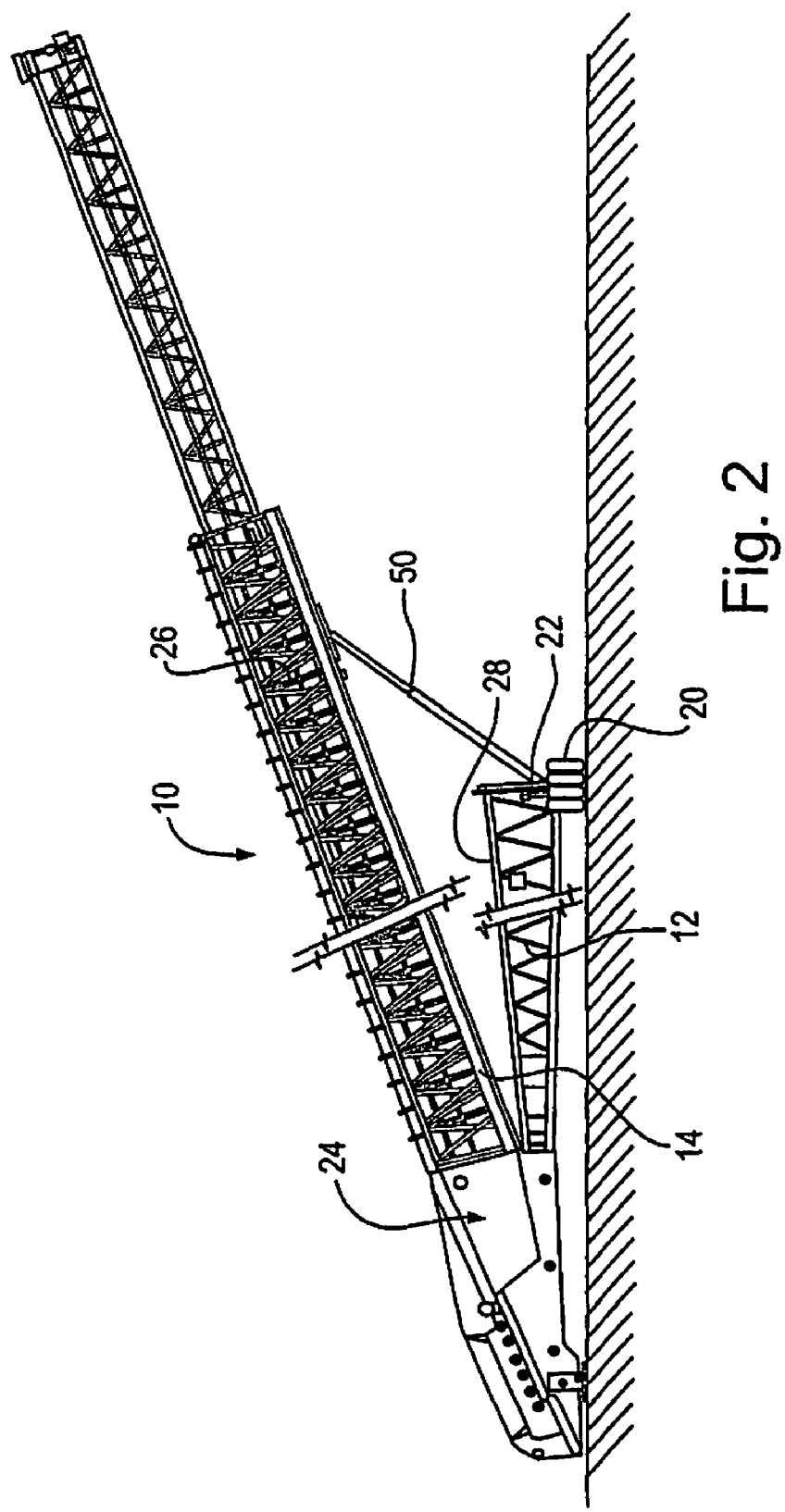
FIG. 2 is a side elevational view showing an outline of one embodiment of the present invention where the inner conveyor system is shown in an extended raised position and with the feed section being mounted at a very low position relative to the ground and to the telescopic conveyor system.
Figure 3:
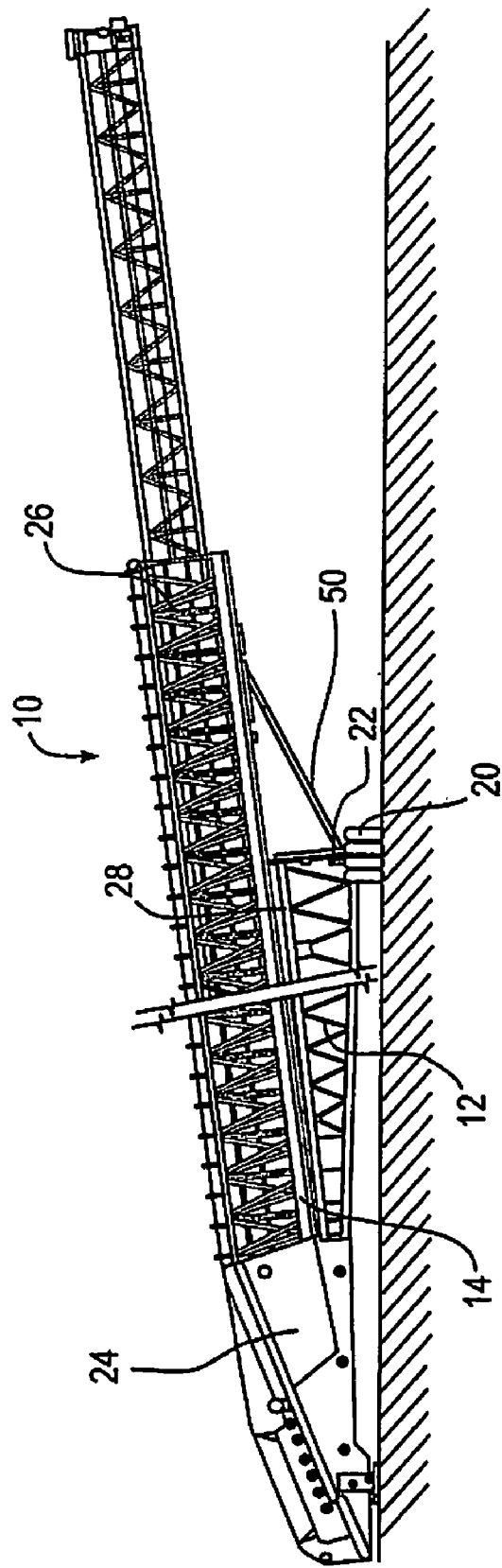
FIG. 3 is a side elevational view showing an outline of the system of the present invention where the inner conveyor system is shown in an extended lower position and with the feed section being mounted at a very low position relative to the ground and to the telescopic conveyor system.

A typical prior art telescopic conveyor system is shown in FIG. 1 and indicated generally by reference numeral 10 and the base frame indicated generally by reference numeral 12. Base frame 12 can have various configurations, one version of which is shown in FIG. 1 and other versions shown in FIGS. 2 through 6.

The conveyor system (which can be telescopic or non-telescopic) which is illustrated in FIGS. 2 through 8 herein, can be any typical system such as that disclosed in Canadian '202 (supra). For purposes of exemplification of the present invention, FIGS. 2 through 8 illustrate a typical telescopic conveyor system. In such a system, the base frame 14 of the prior art system for the telescopic conveyor can comprise any suitable base frame which typically includes frame members and a plurality of braces.

As seen from FIG. 1, there are two sets of wheels provided for transport of the conveyor system indicated generally by reference numeral 20. The drive wheels 20 are used for highway transport and are adapted, when the conveyor system is at a work site, to be turned outwardly and positioned radially relative to the conveyor system 10, to permit radial movement of the conveyor at a work site. If desired, auxiliary wheels can be used primarily for transport of the conveyor system over a roadway; in a typical arrangement, the auxiliary wheels would be positioned rearwardly of the end frame member or section 22 of the base frame supporting the conveyor system.

Referring to FIGS. 2 through 5, a broad outline of the system of the present invention is shown in its various configurations. In these figures, the telescopic conveyor system includes a feed section 24 operatively associated with the telescopic conveyor system and with a transport and wheel positioning frame 28", all of which per se are known assemblies for utilized conventional technology. Similarly, the hydraulic system for elevating and extending the conveyor system, used in the present invention, and indicated generally by reference numeral 50, may be any suitable conventional system.

Figure 6:
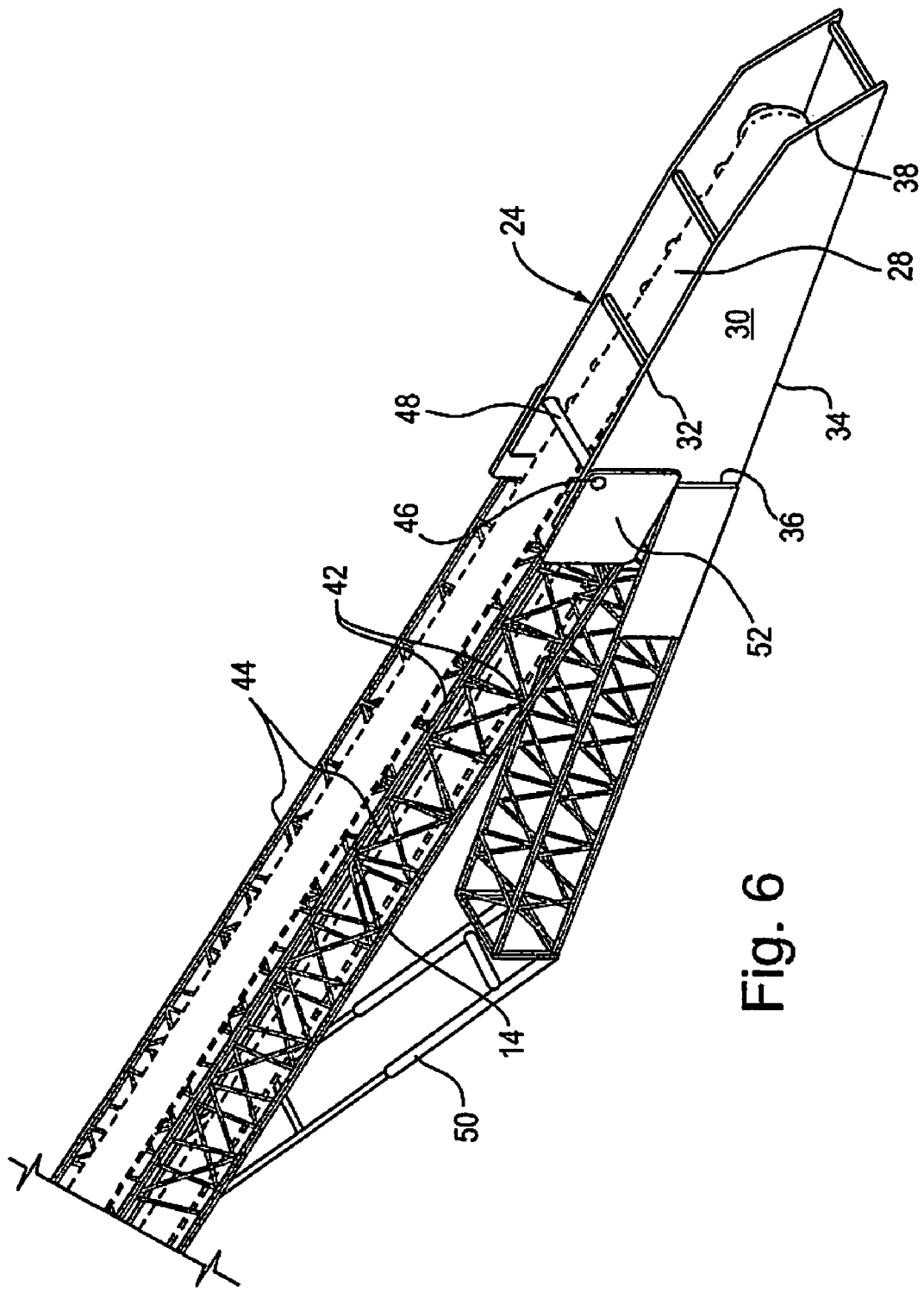
FIG. 6 is a side perspective view of a partially assembled conveyor system with part of the feed system being shown and with a lower support frame for use in a transport mode and for positioning the assembly for on-site use.

Digressing for a moment, and with reference to FIG. 6, the feed section 24 normally comprises an elongated unit adapted to receive material to be fed to the telescopic conveyor system; this feed section 24 comprises (see FIG. 7) a plurality of rollers 26 in a concave shaped configuration, supporting a conveyor belt (not shown). Material to be fed to the telescopic conveyor is loaded by e.g. conventional loaders normally through the top opening of the feed system indicated generally by reference numeral 28, and onto a conveyor belt. Referring again to FIG. 6, the side frame members of the feed section, indicated by reference numeral 30, have upper and lower sides 32 and 34 as well as front and rear sides 36 and 38 respectively (or head and tail directions) of the feed section. The telescopic conveyor shown in FIG. 6 is shown without the inner extendible and retractable conveyor system, for the sake of clarity. The outer conveyor assembly includes a rectangular frame composed of suitable metal bars or sub-frame assemblies mounted in opposed pairs of such frame members 42 and 44.

Figure 8:
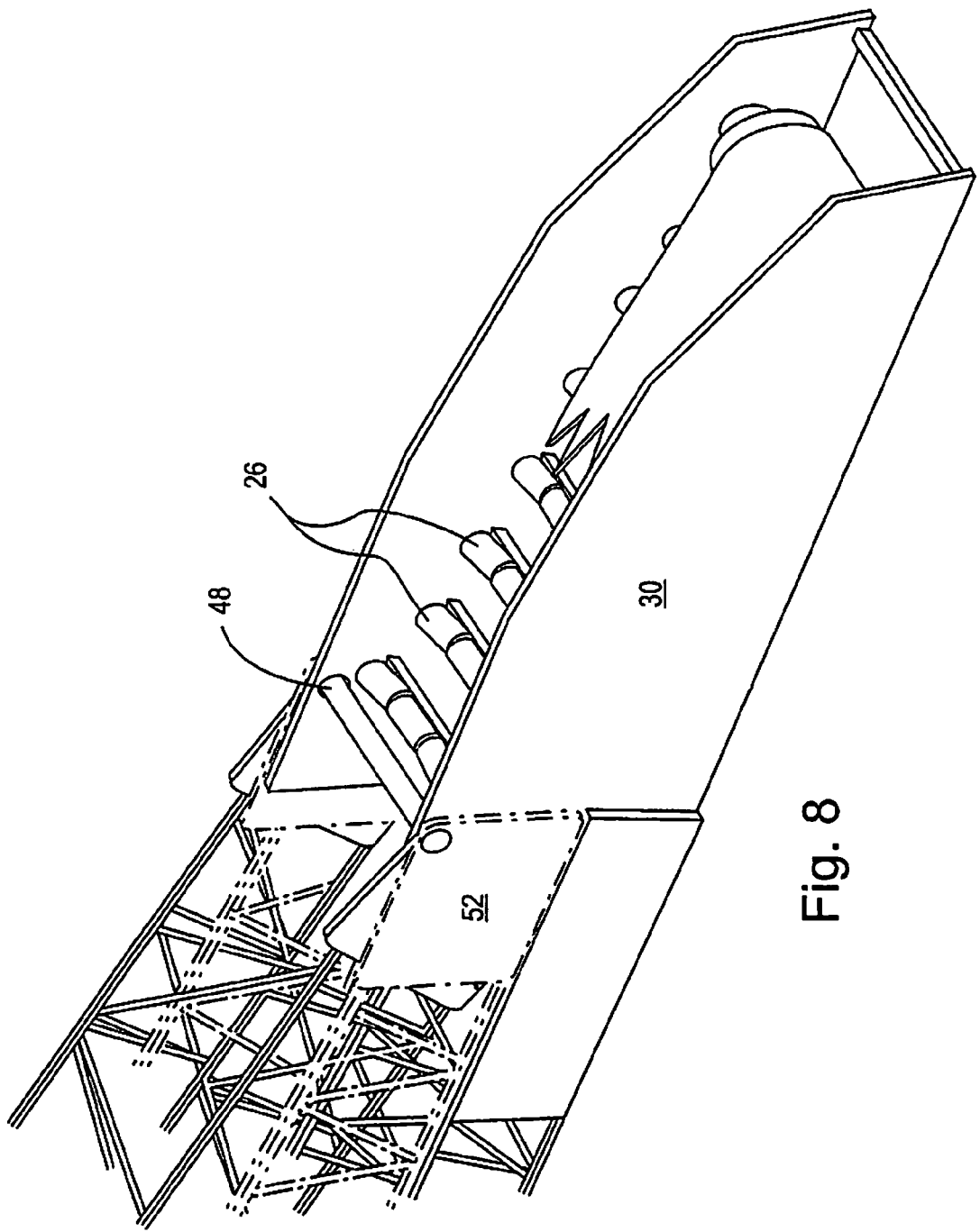
FIG. 8 is a top partial perspective view showing a portion of the pivoting system of the present invention.

Close to the upper side of the feed system in the head direction, as will be seen from FIG. 6, there is provided a pivot joint located between the lower portion of the outer conveyor system and the upper side of the feed section, indicated by reference numeral 46 and shown in greater detail in FIG. 8. More particularly, a shaft 48 extends between and through the side walls 30 of the frame of the feed system and anchored on the exterior (as seen in FIG. 6) with suitable blocking means such as bolts, pins or the like.

Figure 7:
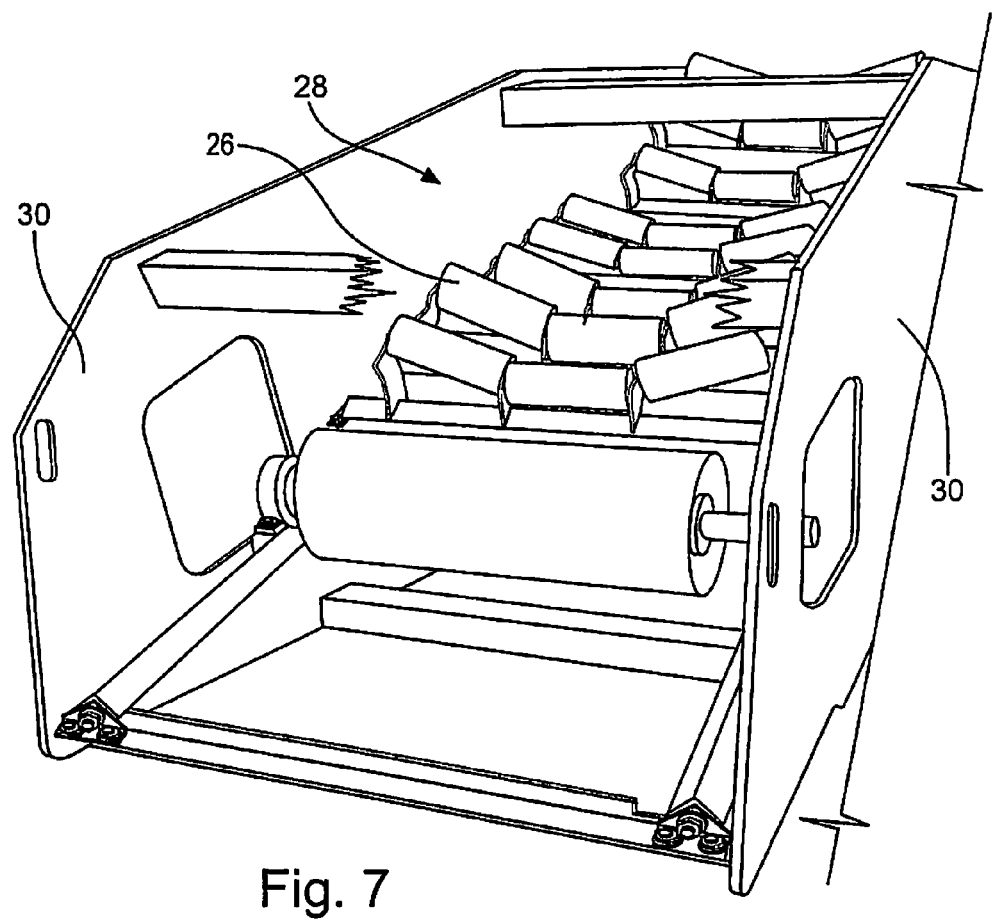
FIG. 7 illustrates an end view of the feed section of a typical telescopic conveyor system.

FIG. 7 illustrates in greater detail the feed section of a typical telescopic conveyor assembly with the conveyor removed for the sake of clarity. This type of feed section previously, since it was firmly or fixedly attached to the conveyor assembly, had to be adjusted for different types of operation. By virtue of the fact that the conveyor assembly is pivotably connected to the feed section (as seen in FIG. 8) the feed section may be lowered significantly and thus avoid adjustments in use. The telescopic conveyor assembly since it is pivotably connected to the feed section can be used for any necessary adjustments.

As seen in FIGS. 6 and 8, preferably the telescopic conveyor section is pivotably attached at the upper section or portion of the frame of the feed assembly; however, it will be obvious that the pivoting movement of the telescopic assembly can be changed so that the pivot can be located at different positions depending on any specific use or application. The telescopic conveyor section in the embodiment illustrated ends approximately where the reinforcing side plate 52 of the telescopic conveyor is located and thereafter the feed section commences; the side frame members 30 meet the plates 52 (see FIG. 6). To be pivotable, the shaft 48 extends through the upper end of the plate 52 as well as through the feed section plate 30 thus providing means for the telescopic conveyor assembly to be raised or lowered by a suitable system.

As will be seen from the above, the structure of the present invention thus provides a conveyor system separately moveable by a pivot action relative to the feed section which will provide not only the advantages that a feed section could be mounted at a lower level, but also, for independent movement of the telescopic conveyor system independently of the feed section.

It will be clear to those skilled in the art that the advantages of attaching the telescopic conveyor section by means of a pivot can result in several advantages amongst which are the fact that the feed section can now be fixedly located in a lower position which will aid in loading the feed section; the fact that a constant feed height can be obtained and thus permit different types of feeding equipment to be used.

It will be clear to those skilled in the art that the advantages of attaching the telescopic conveyor section by means of a pivot can result in several advantages amongst which art the fact that the feed section can now be fixedly located in a lower position which will aid in loading the feed section; the fact that a constant feed height can be obtained and thus permit different types of feeding equipment to be used.

Referring now to FIGS. 9 through 11, a second embodiment of the present invention is illustrated, where the movable feed section indicated generally by reference numeral 60 is adapted to move laterally during formation of aggregate piles or the like. FIG. 10 illustrates one side of the feed section which is formed by a frame 62 which in this case, comprises an elongated sheet metal plate terminating at the loading end indicated generally by reference numeral 64. At the loading end, material to be fed to the conveyor is discharged by trucks or other known systems.

When a truck off-loads e.g. aggregate or other material to the feed section, aggregate material sometimes falls or is displaced over the sides of the frame 62 in the areas indicated generally by reference numeral 66; depending on the particular configuration of the feed section and its length, spillage of the aggregate may extend for several feet from the loading end of the feed section rearwardly towards the feed conveyor. This can be a problem affecting the lateral movement of the conveyor assembly—in many cases, the build-up of material in the area indicated by reference numeral 66 will have to be moved by machine or manually, to permit free lateral movement of the conveyor assembly.

In the embodiment illustrated, there is provided a means of eliminating the need for manual or machine usage to remove the built up areas of aggregate or the like; this is accomplished by providing a baffle system as illustrated in the drawings. The baffle system of the present invention includes a hingedly mounted plate 70 located on either side of the loading/feed section of the conveyor system; the baffle plate 72 as illustrated in greater detail in FIG. 11 includes a non-flexible or rigid sheet member which can be made of heavy steel plate. As illustrated in this embodiment, the baffle members 72 are hingedly and pivotally mounted to the frame 62 by means of hinges shown in FIG. 10. These hinges include pairs of spaced-apart hinge members 74 in which a portion of the hinge includes a section 76 fixedly secured to the side frame member 72 and another portion 78 fixedly secured to the baffle plate 72.

As illustrated in FIGS. 9 to 11, the baffle plates under normal conditions (that is when there is no lateral movement of the conveyor or feed section) will rest against the side frame member 62 preventing their displacement; upon lateral movement of the feed section say, e.g. to the left as shown in FIG. 9, the baffle plate on the left hand side 72*a* will remain in juxtaposition with the frame 62 thus pushing any aggregate surrounding the feed section to displace the aggregate out of the path of the feed section as it travels in that direction. In the meantime, baffle plate 72*b* (FIG. 9) will hingedly pivot away from the side frame member 62 as the feed section moves to the left as described above.

The reverse situation will occur when the feed section moves laterally to the right where the baffle member 72*b* will be in juxtaposition with the side frame member 62 and baffle plate 72*a* will be free to be displaced.

As illustrated in the drawings, in one embodiment of the present invention there are two sets of baffle plates on each side of the feed section; the second set of baffle plates is indicated by reference numeral 70'. The requirement for either a continuous or plurality of baffle plates on either side of the feed section will depend on the particular structure of the feed section at its lower extremity and the length of the feed section where aggregate is dumped into the feed inlet. In the embodiment shown in FIG. 10, there is no need for the baffle plates to be continuous since the aggregate build-up in the area 63 of the feed section will displace aggregate material upon lateral movement of the feed section.

It will be understood that various modifications can be made to the above described embodiments without departing from the spirit and scope of the invention described herein.

The invention claimed is:

1. In a conveyor system for transporting material, which is either telescopic or non-telescopic, and in which said system has:
   a feed section operatively associated with said conveyor system for feeding materials to one end of the conveyor system;
   a movable feed section operatively associated with said conveyor system for feeding materials to a feed end of the conveyor system, said feed section having opposed side frame members at the feed end thereof, with a conveyor feed between said opposed side frame members;
   said opposed frame members of said feed section each having associated therewith baffle means, each of said baffle means being, adapted to move between first and second positions upon lateral movement of said feed section; and
   means for mounting each of said baffle means to a respective one of said side frames to permit one of said baffle means to be placed in a first non-movable position when said feed section laterally moves in a first direction with the other of said baffle means being movable when said feed section moves in said first direction,
   wherein the improvement comprises said conveyor system being pivotably mounted to said feed section to pivot said conveyor system to pivotably rotate relative to said feed section, and
   wherein said feed section laterally moves in an opposite second direction, said first baffle means which is non-movable in said first position is movable when said feed section laterally moves in said second opposite direction, said other of said baffle means being non-movable when said feed section moves in said second opposite direction.

2. The conveyor system of claim 1, wherein said conveyor system includes a lower section pivotably associated with an end section of said feed section.

3. The conveyor system of claim 1, wherein said conveyor system includes a rectangular frame having pairs of spaced-apart frame members, said feed section of said conveyor system having a terminal end operatively connected to said conveyor system for feeding materials from said feed section to said conveyor system, said feed section being pivotably connected to said conveyor system by means of a pivot, directly or indirectly connected to one pair of said outer frame members.

4. The conveyor system of claim 3, wherein said feed section comprises a non-movable feed section adapted to retain the same position of relationship with said conveyor system for feeding said conveyor system and for transporting of the conveyor system.

5. The conveyor system of claim 4, wherein the pivot point of said conveyor system relative to said feed section is spaced from a lower side of said feed section.

6. The conveyor system of claim 1, wherein said conveyor system is a telescopic conveyor system having at least one inner conveyor system extendible and retractable within an outer conveyor system.

7. The system of claim 1, wherein each said baffle means is pivotally mounted to a respective side frame member and is movable between said first and second positions, said baffle means being mounted in opposed relationship on said side frame members.

8. The system of claim 7, wherein said baffle means are baffle plates hingedly connected to a respective side frame member.

9. The system of claim 1, wherein said baffle means are mounted to a respective side frame member in a position at a lower edge of said side frame members.

10. The system of claim 1, wherein said baffle means includes at least two spaced-apart baffle plates on each side frame member.

11. In a conveyor system for transporting material, which is either telescopic or non-telescopic, said system having:
   a movable feed section operatively associated with said conveyor system for feeding materials to a feed end of the conveyor system, said feed section having opposed side frame members at the feed end thereof, with a conveyor feed between said opposed side frame members; and
   wherein the improvement comprises said feed section having said opposed frame members each having associated therewith baffle means, each of said baffle means being adapted to move between first and second positions upon lateral movement of said feed section;
   and means for mounting each of said baffle means to a respective one of said side frames to permit one of said baffle means to be placed in a first non-movable position when said feed section laterally moves in a first direction with the other of said baffle means being movable when said feed section moves in said first direction,
   and wherein said feed section laterally moves in an opposite second direction, said first baffle means which is non-movable in said first position is movable when said feed section laterally moves in said second opposite direction, said other of said baffle means being non-movable when said feed section moves in said second opposite direction.

12. The system of claim 11, wherein each said baffle means is pivotally mounted to a respective side frame member and is movable between said first and second positions, said baffle means being mounted in opposed relationship on said side frame members.

13. The system of claim 12, wherein said baffle means are baffle plates hingedly connected to a respective side frame member.

14. The system of claim 11, wherein said baffle means are mounted to a respective side frame member in a position at a lower edge of said frame members.

15. The system of claim 11, wherein said baffle means includes at least two space-apart baffle plates on each of said side frame members.

16. The system of claim 11, wherein said conveyor system is a telescopic conveyor system having at least one inner conveyor system extendible and retractable within an outer conveyor system.

* * * * *